July 23, 1946.   J. R. SNYDER   2,404,666
SHOCK ABSORBING DEVICE
Filed Nov. 8, 1944
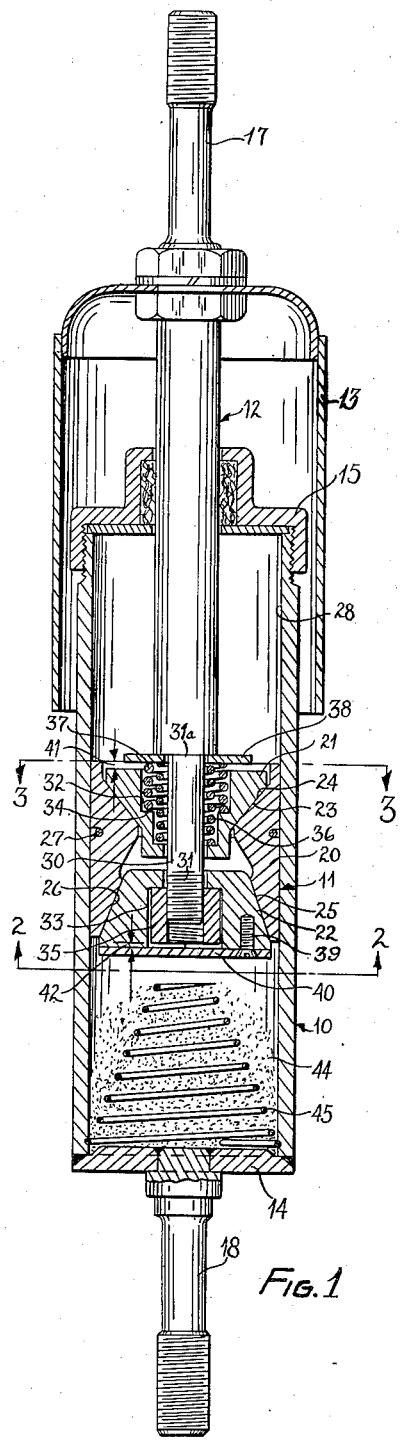
Fig. 1
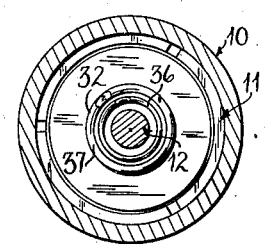
Fig. 3
Fig. 2
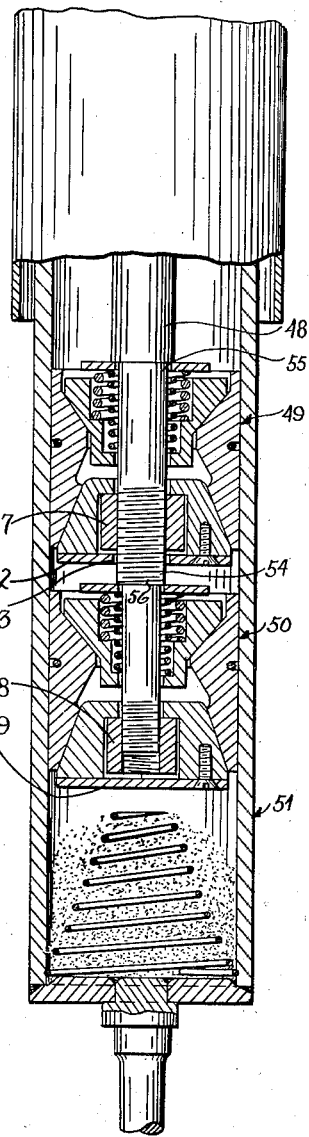
Fig. 4
INVENTOR.
JACOB RUSH SNYDER
BY
Kwis Hudson Boughton & Williams
ATTORNEYS Patented July 23, 1946

2,404,666

UNITED STATES PATENT OFFICE 2,404,666

SHOCK ABSORBING DEVICE

Jacob Rush Snyder, Cleveland, Ohio, assignor to Thompson Products, Inc., Cleveland, Ohio, a corporation of Ohio Application November 8, 1944, Serial No. 562,492

8 Claims. (Cl. 188—129)

This invention relates to shock absorbing devices and, as one of its objects, aims to provide an improved device of this kind which can be applied to various uses but which is especially suitable for certain heavy-duty installations such as on railway cars.

In the case of shock absorbing devices for use on railway cars it is usually desirable that these devices be capable of operation such that their compression stroke is relatively free or unretarded and their main shock absorbing action is produced during the rebound stroke. Accordingly since the shock absorbing function is accomplished in this form of device mainly or solely during the rebound stroke, it is highly desirable that the device be capable of developing a strong retarding action during such rebound stroke.

It is, therefore, another object of the present invention to provide an improved shock absorber of this character, which is of a rugged and reliable, yet relatively simple, construction and wherein the compression stroke is relatively free or unretarded and a strong shock absorbing action is developed mainly or solely during the rebound stroke.

A further object of this invention is to provide an improved direct-acting friction shock absorber of the kind embodying an expansible friction sleeve and a tapered expander and in which novel means is employed for actuating the expander so that a relatively free compression stroke and a relatively strongly retarded rebound stroke is obtained.

It is also an object of this invention to provide an improved shock absorber construction embodying a case-hardened cylinder which renders the device strong and durable and which makes it possible for the device to operate with a substantially constant coefficient of resistance throughout a prolonged period of service.

The invention can be further briefly summarized as consisting in certain novel combinations and arrangements of parts hereinafter described and particularly set out in the appended claims.

In the accompanying sheet of drawings,

Fig. 1 is a longitudinal sectional view taken through a shock absorber embodying the novel construction of this invention.

Fig. 2 is a transverse sectional view taken on line 2—2 of Fig. 1.

Fig. 3 is another transverse sectional view taken on line 3—3 of Fig. 1, and

Fig. 4 is a partial longitudinal sectional view taken through a modified form of the improved shock absorber.

As shown in the accompanying drawing, the improved shock absorber comprises in general an elongated tubular housing or cylinder 10, a friction unit 11 reciprocable in the housing, and an actuating rod 12 disposed coaxially of the cylinder and connected with the friction unit 11. A tubular dust guard 13 carried by the rod 12 telescopes around the cylinder 10, as is usual in shock absorbing devices of this kind. The cylinder 10 is closed at its lower end by means of the plate or disk 14 which is welded to the cylinder tube, and is closed at its upper end by means of a cover 15 through which the actuating rod 12 slidably extends. The outer end of the actuating rod 12 and the lower end of the cylinder 10 are provided, respectively, with threaded pins or stems 17 and 18 by which the device can be attached to a pair of relatively movable parts to be retarded.

The friction unit 11 comprises an expansible sectional sleeve 20 formed of a suitable friction material, preferably a non-metallic molded material, and a pair of expanders 21 and 22 extending into opposite ends of the friction sleeve. The upper end of the sleeve 20 is provided with a tapered annular internal surface 23 with which a substantially conical external surface 24 of the upper expander 21 cooperates. The lower end of the sleeve 20 is provided with an internal tapered annular surface 25 of lobular form with which a tapered external lobular surface 26 of the lower expander 22 cooperates. The segments constituting the friction sleeve 20 are held in assembled relationship by means of the spring wire ring 27 extending around the sleeve and lying in an external annular groove thereof. The spring 27 tends to contract the friction sleeve for releasing the frictional engagement of the same with the working surface 28 of the cylinder 10.

The actuating rod 12 is provided at its inner end with a relatively reduced portion or stem 30 which is threaded for a portion of its length, as indicated at 31. An annular shoulder 31a is formed on the rod 12 at the upper end of the reduced portion 30 thereof. The expanders 21 and 22 are provided, respectively, with axially extending recesses 32 and 33 which receive and accommodate the relatively reduced rod portion 30. The recess 32 of the upper expander 21 is of cylindrical form and includes an internal annular shoulder 34. The recess 33 of the lower expander 22 is of hexagonal or other non-circular cross-sectional shape and a nut 35 confined in the recess 33 is screwed part-way onto the threaded portion 31 of the relatively reduced rod section 30 for retaining the friction sleeve on the latter. The interengaging lobular portions of the sleeve 20 and the expander 22 hold the nut 35 against unscrewing from the actuating rod.

A preloading spring 36 is disposed in the axial recess 32 of the expander 21 and around the rod portion 30 for exerting a predetermined force on the expander tending to expand the friction sleeve 20. A second coil spring 37 disposed in the recess 32 in engagement with the shoulder 34 forms a yieldable stop or gauging means for limiting the initial compression of the preloading spring 36 and thus facilitating the initial adjustment of the friction unit. A washer 38 overlying the upper end of the expander 21 engages the shoulder 31a of the actuating rod and forms a seat for the coil springs 36 and 37.

As will be readily seen from the drawing, the nut 35 has a limited relative axial shifting in the recess 33 of the expander 22 and is confined therein by means of a closure plate 40 which is attached to this expander by means of the screws 39 and which plate forms an abutment means or shoulder which is adapted to be engaged by the lower end of the nut 35. The resistance unit 11 is so constructed and assembled that an initial space 41 separates the washer 38 from the adjacent end of the expander 21 and a relatively smaller space 42 separates the lower end of the nut 35 from the abutment plate 40. The spaces 41 and 42 provide for lost-motion operating connections between the actuating rod 12 and the respective expanders 21 and 22.

As pointed out above in a general way, it is desirable that this shock absorber have a relatively free or unretarded compression stroke and the construction which I have just described above for the resistance unit 11 makes it possible to obtain this result. During a downward movement of the rod 12 relative to the cylinder 10 the coil springs 36 and 37 will be compressed somewhat but before the washer 38 engages the adjacent end of the expander 21, the lower end of the nut 35 will engage the abutment plate 40 causing the expander 22 to be retracted from the internal tapered surface 25 of the sleeve 20. The retraction of the expander 22 from the sleeve 20 in this manner releases the frictional engagement between the sleeve and the cylinder wall so that the resistance unit 11 can be moved downwardly relatively freely in the cylinder by the actuating rod 12. During this downward movement of the friction unit, the upper expander 21 is acted upon only by the springs 36 and 37 and the sleeve 20 will therefore be subjected to very little, if any, expanding action by this upper expander at this time.

On the rebound stroke the actuating rod 12 moves upwardly relative to the cylinder 10, whereupon the nut 35 shifts upwardly in the recess 33 of the expander 22 so as to solidly engage the upper or inner end of the recess and wedge the tapered surface 26 of the expander 22 against the internal tapered surface 25 of the sleeve 20. This will produce an immediate expansion of the sleeve 20 into strong frictional engagement with the working surface 28 of the cylinder. The lifting and spreading action exerted on the segments of the sleeve by the expander 22 will also cause the internal tapered surface 23 of the segments to be wedged upwardly against the external tapered surface 24 of the upper expander 21, thus also expanding the upper end of the sleeve 20 against the cylinder wall.

I find it desirable to confine a quantity of loose dry lubricating powder 44, such as calcium stearate, in the cylinder 10 for lubricating the various moving parts of the resistance unit 11 and the working surface 23 of the cylinder. This powder can be maintained in a loose and agitated condition by means of a conical coil spring 45 located in the lower end of the cylinder and which is flexed from time to time by the resistance unit 11.

For improving the operating characteristics of the shock absorber I preferably construct the cylinder 10 from steel tubing and treat the same so that the internal working surface 28 thereof is case-hardened. This treatment of the cylinder can be accomplished in any known manner and renders the same strong and rigid so that it will not be likely to become warped or stretched during the operation of the device. The case-hardened inner surface of the cylinder also provides a wear- and abrasion-resistant face against which the resistance unit 11 will have a substantially constant coefficient of friction which is substantially unaffected by seasonal or temperature changes. Since the inner surface of the cylinder is wear- and abrasion-resistant, as just mentioned, there will be little tendency for particles or shreds of metal to become loosened or abraded from the inner surface of the cylinder, and which if mixed with the powder 45, would render the action of the shock absorber very erratic and unsatisfactory.

In Fig. 4 of the drawing I show a modified construction for this shock absorber in which the actuating rod 48 carries two resistance units 49 and 50. By using two such units in the same cylinder 51 I obtain a greater shock absorbing action by reason of the increased area provided between the friction sleeves and the cylinder wall. In this modified construction the friction units 49 and 50 are of substantially identical construction with the unit 11 above described except that the abutment plate 52 of the upper friction unit 49 has a central opening 53 through which a threaded portion 54 of the actuating rod 48 extends. At a point spaced above the threaded portion 54 the rod 48 is provided with a shoulder 55 corresponding with the shoulder 31a of Fig. 1 and at a point below the threaded portion 41 the rod is provided with a second shoulder 56 for cooperation with the upper end of the friction unit 50.

During the use of a shock absorber embodying the modified construction of Fig. 4 it will be seen that downward relative movement of the rod 48 will cause the nuts 57 and 58 to engage the abutment plates 52 and 59 of the respective friction units 49 and 50, causing the lower expanders of these units to be retracted relative to the friction sleeves for releasing the frictional engagement with the wall of the cylinder. This will permit the downward relative movement of the actuating rod 48 to take place in a relatively free or substantially unretarded manner, but during the rebound stroke the upward relative movement of the rod 48 will cause the lower expanders of the friction units 49 and 50 to act effectively on the friction sleeves to expand the same into strong frictional engagement with the wall of the cylinder 51.

From the foregoing description and the accompanying drawing it will now be readily understood that the present invention provides an improved shock absorber construction which is well suited for heavy-duty service such as on railway cars. It will be seen moreover that in this improved construction a relatively free compression stroke and a strongly retarded rebound stroke is obtainable. It will also be seen that the case-hardening of the cylinder provides the same with advantageous characteristics as explained above.

While I have illustrated and described my improved shock absorber construction in considerable detail, it will be understood, of course, that I do not wish to be correspondingly limited but regard my invention as including all changes and modifications coming within the spirit of the invention and the scope of the appended claims.

Having thus described my invention, I claim:

1. In a shock absorber, a cylinder, an expansible sleeve slidable in said cylinder, a tapered expander cooperating with said sleeve, said expander having therein a recess provided with axially spaced abutment means, and an actuating rod disposed coaxially of said cylinder and sleeve and having shoulder means confined in said recess, said shoulder means having limited axial shifting in said recess between said spaced abutment means for forming a lost-motion operating connection between said rod and expander.

2. In a shock absorber, a cylinder, an expansible sleeve slidable in said cylinder, a tapered expander cooperating with said sleeve, said expander having an axial recess therein and abutment means adjacent the outer end of said recess, an actuating rod disposed coaxially of said cylinder and extending into the recess of said expander, and means carried by the rod and shiftable in said recess so as to form a lost-motion operating connection between said rod and expander, such shiftable means being engageable with the inner end of said recess for causing the expander to expand said sleeve into frictional engagement with the cylinder wall during relative movement in one direction between said rod and cylinder and being engageable with said abutment means for retracting the expander from the sleeve during relative movement in the opposite direction between said rod and cylinder.

3. In a shock absorber, a cylinder, an expansible sleeve slidable in said cylinder, a tapered expander cooperating with said sleeve, said expander having an axial recess therein and abutment means adjacent the outer end of said recess, an actuating rod disposed coaxially of said cylinder and having a threaded portion extending into the recess of said expander, and a nut on said threaded portion and shiftable axially in said recess so as to form a lost-motion operating connection between said rod and expander, said nut being engageable with the inner end of said recess for causing the expander to expand said sleeve into frictional engagement with the cylinder wall during relative movement in one direction between said rod and cylinder and being engageable with said abutment means for retracting the expander from the sleeve during relative movement in the opposite direction between said rod and cylinder, the cooperating portions of said sleeve and expander being of lobular shape to prevent rotation of the expander and nut relative to said rod.

4. In a shock absorber, a cylinder, an expansible sleeve slidable in said cylinder, a pair of oppositely tapered expanders cooperating with opposite ends of said sleeve, an actuating rod disposed coaxially of said cylinder and sleeve, and shoulder means provided on the rod for the respective expanders and spaced apart axially of the rod, one of said expanders having an opening therethrough for the rod and the other expander having a recess therein in which the corresponding shoulder means of the rod is confined and has limited relative axial shifting, the recess of said other expander being provided with axially spaced abutment means between which the shoulder means provided on said rod for the corresponding expander is disposed.

5. In a shock absorber, a cylinder, an expansible sleeve slidable in said cylinder, a pair of oppositely tapered expanders cooperating with opposite end portions of said sleeve, one of said expanders having an axial opening therethrough and the other expander having an axial recess therein and abutment means adjacent the outer end of such recess, an actuating rod disposed coaxially of said cylinder and extending through said one expander and into said recess of the other expander, shoulder means on said rod adjacent said one expander and cooperating therewith to form a lost-motion operating connection therebetween, and means on said rod and shiftable in the recess of said other expander so as to form a lost-motion operating connection between said rod and other expander and being engageable with said abutment means during the relative movement permitted between said rod and other expander by said lost-motion connection.

6. In a shock absorber, a cylinder, an expansible sleeve slidable in said cylinder, a pair of oppositely tapered expanders cooperating with opposite end portions of said sleeve, one of said expanders having an axial opening therethrough and the other having an axial recess therein and abutment means adjacent the outer end of such recess, an actuating rod disposed coaxially of said cylinder and extending through said one expander into said recess of the other expander, shoulder means on said rod adjacent said one expander and cooperating therewith to form a lost-motion operating connection therebetween, and means on said rod and shiftable in the recess of said other expander so as to form a lost-motion operating connection between said rod and other expander the free relative movement permitted between said one expander and said shoulder means by the first-mentioned lost-motion connection being greater than the free relative movement permitted between said rod and said other expander by the last-mentioned lost-motion connection.

7. In a shock absorber, a cylinder, a pair of resistance units operable in said cylinder and spaced apart axially thereof, each of said units comprising an expansible sleeve and a pair of oppositely tapered expanders cooperating with opposite ends of the sleeve, an actuating rod extending into said cylinder at one end thereof, said rod extending completely through the resistance unit which is nearest said one end of the cylinder and having spaced shoulder means cooperating with the expanders of such resistance unit, and means including other spaced shoulder means operably connecting the inner end portion of said rod with the expanders of the other resistance unit.

8. In a shock absorber, a cylinder, a pair of resistance units operable in said cylinder and spaced apart axially thereof, each of said units comprising an expansible sleeve and a pair of oppositely tapered expanders cooperating with opposite ends of the sleeve, an actuating rod extending into the cylinder at one end thereof, said rod extending completely through the resistance unit which is nearest said one end of the cylinder and also extending into the other resistance unit, the corresponding expanders of said units which are the more remote from said one end of the cylinder having recesses therein, shoulder means carried by said rod and spaced apart axially thereof for cooperation with the corresponding expanders of said units which are nearest said one end of the cylinder, and other shoulder means on the rod and spaced apart axially thereof and confined in the recesses of said more remote expanders, the shoulder means confined in said recesses being capable of limited relative axial shifting therein.

JACOB RUSH SNYDER.